United States Patent
Mitsunaga et al.

(10) Patent No.: US 7,525,885 B2
(45) Date of Patent: Apr. 28, 2009

(54) INFORMATION REPRODUCTION AND RECORDING APPARATUS AND INFORMATION TRANSFER MODULE

(75) Inventors: Hidenori Mitsunaga, Kobe (JP); Takashi Kouno, Kobe (JP); Osamu Okada, Kobe (JP); Mitsuya Kawashita, Yokohama (JP)

(73) Assignees: Fujitsu Ten Limited, Kobe-shi (JP); Fujitsu Limited, Kawasaki-shi (JP)

( * ) Notice: Subject to any disclaimer, the term of this patent is extended or adjusted under 35 U.S.C. 154(b) by 680 days.

(21) Appl. No.: 11/136,177

(22) Filed: May 23, 2005

(65) Prior Publication Data

US 2005/0259535 A1 Nov. 24, 2005

(30) Foreign Application Priority Data

May 24, 2004 (JP) .............................. 2004-153526
May 20, 2005 (JP) .............................. 2005-148168

(51) Int. Cl.
*G11B 7/00* (2006.01)
(52) U.S. Cl. ..................................... 369/47.1; 369/59.1
(58) Field of Classification Search ........................ None
See application file for complete search history.

(56) References Cited

U.S. PATENT DOCUMENTS 6,868,463 B1 * 3/2005 Jung et al. .................. 710/100

2002/0083393 A1 * 6/2002 Hall et al. .................... 714/785
2002/0101772 A1 8/2002 Denda et al.

FOREIGN PATENT DOCUMENTS

JP 2002-230893 8/2002

* cited by examiner

*Primary Examiner*—Wayne R Young
*Assistant Examiner*—Van N Chow
(74) *Attorney, Agent, or Firm*—Christie, Parker & Hale, LLP

(57) ABSTRACT

An information reproduction and recording apparatus able to prevent invalid data not required for recording from being recorded on a recording medium when transferring reproduced information by a small number of signal lines such as a three-line serial peripheral interface, wherein a music data reproducing unit outputs a data signal DATA and clock signals LRCK and BCK to a valid recording period control unit and outputs a SPACE signal to the valid recording period control unit while outputting music data containing track interval data, the signals are transferred to a high speed encoder and the data signal DATA is encoded and recorded on a hard disk by an HDD based on the clock signals LRCK and BCK while the SPACE signal is being output, and the valid recording period control unit suspends transfer of the clock signal LRCK and prevents recording of invalid data on the hard disk while the SPACE signal is not being output.

9 Claims, 5 Drawing Sheets

INFORMATION REPRODUCTION AND RECORDING APPARATUS AND INFORMATION TRANSFER MODULE

CROSS-REFERENCE TO RELATED APPLICATION

This application claims priority of Japanese Patent Application Number 2004-153526, filed on May 24, 2004, and Japanese Patent Application Number 2005-148168, filed on May 20, 2005.

BACKGROUND OF THE INVENTION

1. Field of the Invention

The present invention relates to an information reproduction and recording apparatus for reproducing from a recording medium on which music information or other information/data is recorded the information/data recorded on the same and recording it on another recording medium and to an information transfer module used for the same.

2. Description of the Related Art

Some audio systems, for example, car-mounted audio systems, are not only provided with compact disk (CD) players or other recording medium reproduction apparatuses to enable music reproduced by these reproduction apparatuses to be enjoyed by audio reproduction systems etc., but are also provided with hard disks of large capacities of for example tens of gigabytes and hard disk drives (HDD) for driving the same to enable the contents of a large number of CDs or other recording media to be dubbed onto the hard disks so as to enable any music tracks to be selected from the hard disks and reproduced by the audio reproduction system etc. for enjoyment (for example, see Japanese Unexamined Patent Publication (Kokai) No. 2002-230893).

With such an audio system, it is possible to record in advance the contents of a large number of recording media, for example, CDs, on the built-in hard disk so as to easily read out from the hard disk and enjoy the favorite tracks of a large number of CDs even without loading and ejecting the CDs. In particular, in a car-mounted audio system, which is frequently operated while driving, dubbing onto a hard disk eliminates the need for loading and ejecting CDs or other recording media. This is preferable from the viewpoint of safe driving.

FIG. 4 is a view of the configuration of a music information reproduction and recording apparatus of the related art for reproducing music information of a CD and recording it on a hard disk. At the time of reproduction and recording of music, a CD player or other music data reproducing unit 2 drives a loaded CD 6 at a high rotational speed under the control of a system controller 1, reads out the tracks of recorded music information/data from the high speed rotating CD 6, and reproduces and outputs them. The reproduced data is encoded at a high speed by a high speed encoder 4, then is supplied to an HDD 5 as recording information/data and recorded on a hard disk (not shown) built in the HDD 5.

Summarizing the problems to be solved by the invention, music CDs contain a plurality of tracks of music, in which either the interval between tracks is soundless or the music data is continuous. Therefore, to record a plurality of tracks on a hard disk of an information reproduction and recording apparatus of the related art configured as explained above without harm to the music data between tracks and without a feeling of strangeness in the transition of the tracks, it is necessary to identify the start and end of each track, including the track intervals, and successively reproduce and output the music data of the section between them.

Therefore, when the system controller 1 instructs the reproduction of the first track, the music data reproducing unit 2 identifies the start and end of that track and reproduces and outputs the music data and track interval data of that section. When recording of the first track of data on the hard disk is completed, the system controller 1 instructs the reproduction of the next track and the music data reproducing unit 2 starts the output of the next track of data, so valid data comprised of the music data and track interval data and invalid data of the next track of data etc. are alternately output from the music data reproducing unit 2 as shown in FIG. 5.

That is, there is invalid data since it is necessary to ignore reproduced data arriving during the processing for compressing, recording, etc. the first track of music data and not including music data. After such processing, reproduced data is transmitted as valid data from the head position of the next track.

In such an information reproduction and recording apparatus, if employing a data transfer system transferring data by a small number of signal lines such as a three-line serial peripheral interface (SPI), the above invalid data also is encoded and recorded on the hard disk causing a feeling of strangeness in the transition between tracks.

That is, with a data transfer system of the three-line serial peripheral interface, when transferring audio signal data (DATA) comprised of an L channel signal and R channel signal alternately arranged, a clock signal LRCK and clock signal BCK are simultaneously transferred. Here, the clock signal LRCK is a transfer clock for identifying the L channel transfer data and R channel transfer data, while the clock signal (bit clock signal) BCK is a transfer clock used for determining the timing of input/output of the transfer data (music data) DATA.

Further, the encoder 4 is designed so as to encode the signal data DATA when receiving both the clock signals LRCK and BCK, but as explained above, the signals used for a three-line serial peripheral interface include the data signal DATA and clock signals LRCK and BCK. These transferred signals do not include information on the start and end of the tracks including the track intervals of the music data. Therefore, invalid data and other redundant data ends up being encoded and recorded on the hard disk in some cases. When reproducing music recorded on the hard disk, the unnecessary signals at the track intervals were reproduced and caused a strange feeling.

SUMMARY OF THE INVENTION

An object of the present invention is to provide an information reproduction and recording apparatus able to prevent invalid data not required for recording from being recorded on a recording medium when transferring information reproduced by a reproducing means by a small number of signal lines such as a three-line serial peripheral interface and to provide an information transfer module used for the same.

To attain the above object, the present invention provides an information reproduction and recording apparatus provided with a music data reproducing unit (2), a valid recording period control unit (3), a high speed encoder (4), and an HDD (5). Here, the music data reproducing unit (2) outputs a data signal DATA and clock signals LRCK and BCK to the valid recording period control unit (3) and outputs a SPACE signal to the valid recording period control unit (3) while outputting music data containing track interval data, the signals are transferred to the high speed encoder (4) and the data signal DATA is encoded and recorded on the hard disk by the HDD (5) based on the clock signals LRCK and BCK while the SPACE signal is being output, and the valid recording period control unit (3) suspends transfer of the clock signal LRCK and prevents recording of invalid data on the hard disk while the SPACE signal is not being output.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
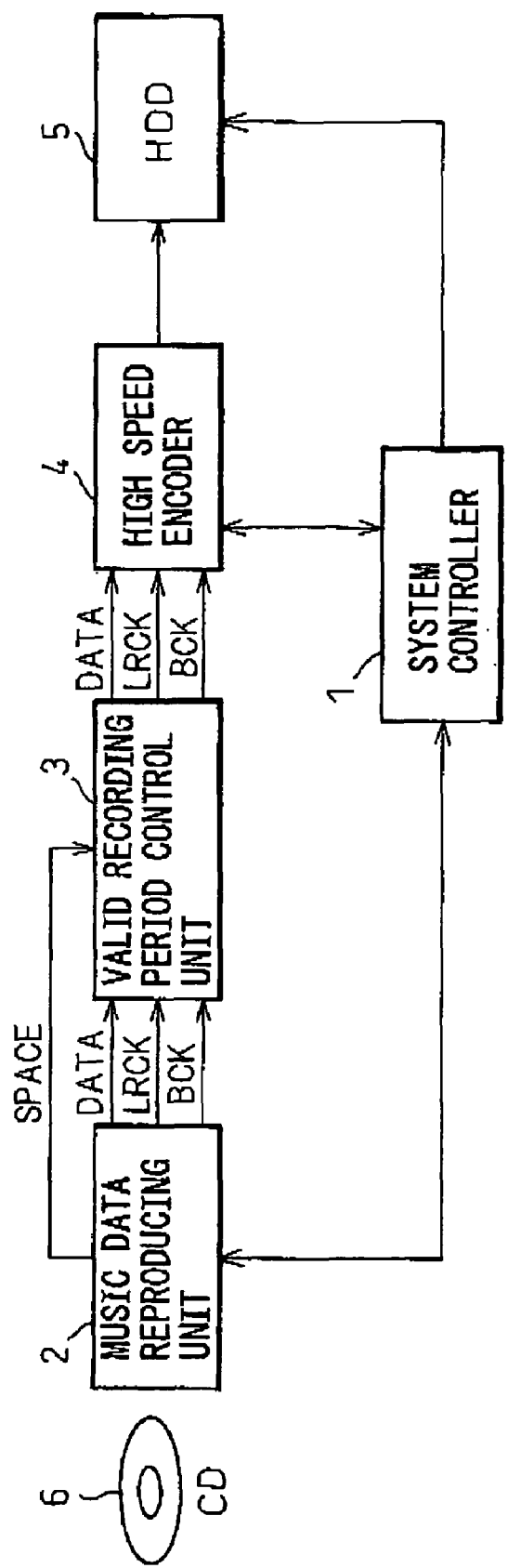
FIG. 1 is a schematic block diagram of a music information reproduction and recording apparatus using an information reproduction and recording apparatus of the present invention.

Preferred embodiments of the present invention will be described in detail below while referring to the attached figures.

According to a first aspect of the present invention, there is provided an information reproduction and recording apparatus provided with a reproducing means for reproducing information recorded on an information recording medium, an information transferring means for transferring information from the reproducing means, and a recording means for recording information from the information transferring means, the reproducing means inputting a valid period signal of information to the information transferring means, and the information transferring means suspending transfer of data to the recording means when the valid period signal is not input.

Preferably, the information reproduction and recording apparatus is further provided with a compressing means for compressing information between the information transferring means and the recording means.

Alternatively, the reproducing means outputs data by a data transfer system of a three-line serial peripheral interface, and the information transferring means suspends transfer of one signal of at least clock signals LRCK and BCK among an input data signal DATA and clock signals LRCK and BCK when the valid period signal is not input.

Alternatively, the reproducing means is a CD reproducing means.

Alternatively, the reproducing means is a DVD reproducing means.

Alternatively, the information reproduced by the reproduction means is music information.

According to a second aspect of the present invention, there is provided an information transfer module able to be installed between a reproducing means for reproducing information recorded on an information recording medium and a recording means for recording the reproduced information, both units are included in an information reproduction and recording apparatus, the information transfer module having at least a suspending means for suspending transfer of data to the recording means when a valid period signal of the information output from the reproducing means is not input.

Preferably, the information transfer module suspends transfer of one signal of at least clock signals LRCK and BCK among an input data signal DATA and clock signals LRCK and BCK when the valid period signal of the information is not input during input of data by a data transfer system of a three-line serial peripheral interface transferring the data signal DATA and clock signals LRCK and BCK output from the reproducing means.

Preferably, the information transfer module is formed as an IC chip.

Summarizing the effects of the invention, according to the information reproduction and recording apparatus of the first aspect of the invention, a CD player, DVD player, or other reproducing means inputs a valid period signal of information to the information transferring means. When that valid period signal is not input, the information transferring means suspends transfer of one signal of at least the clock signals LRCK and BCK among a data signal DATA and clock signals LRCK and BCK of a data transfer system of for example a three-line serial peripheral interface. Therefore, 4x speed recording and other high speed ripping becomes possible by just a few signal lines as with a three-line serial peripheral interface, and invalid data can be prevented from being compressed and recorded. Accordingly, when reproducing information recorded in the recording means, for example, music information, it is possible to prevent a strange feeling in the transition between tracks.

According to the information transfer module of the second aspect of the present invention, it is possible to prevent invalid data not required for recording from being input to the recording means by just inserting the module between a reproducing means and recording means originally provided in an information reproduction and recording apparatus for any type of apparatus.

Next, an embodiment of the case of application of the information reproduction and recording apparatus of the present invention to a music information reproduction and recording apparatus will be explained as an example using the drawings. FIG. 1 is a schematic block diagram of a music information reproduction and recording apparatus. As shown in the figure, the music information reproduction and recording apparatus is comprised of a system controller 1, a music data reproducing unit 2, a valid recording period control unit 3 serving as the information transferring means, a high speed encoder 4, and an HDD 5.

The system controller 1 controls the overall operation of the music information reproduction and recording apparatus by running a predetermined system program. The music data reproducing unit 2 can be loaded with a CD 6 on which a plurality of tracks of music information/data are recorded and can selectively switch between a first state driving the loaded CD 6 by a normal rotational speed substantially equal to the rotational speed at the time of recording the data and a second state driving it by a high rotational speed of for example four times the normal rotational speed.

Further, the system controller 1 receives signals from a control panel (not shown) operated by the user and instructs reproduction to the music data reproducing unit 2 explained above.

Further, when the system controller 1 receives from the high speed encoder 4 a processing completion signal indicating that the encoding of a certain track and the recording in the HDD 5 have been completed, it instructs the music data reproducing unit 2 to reproduce the next track from its head position.

Figure 2:
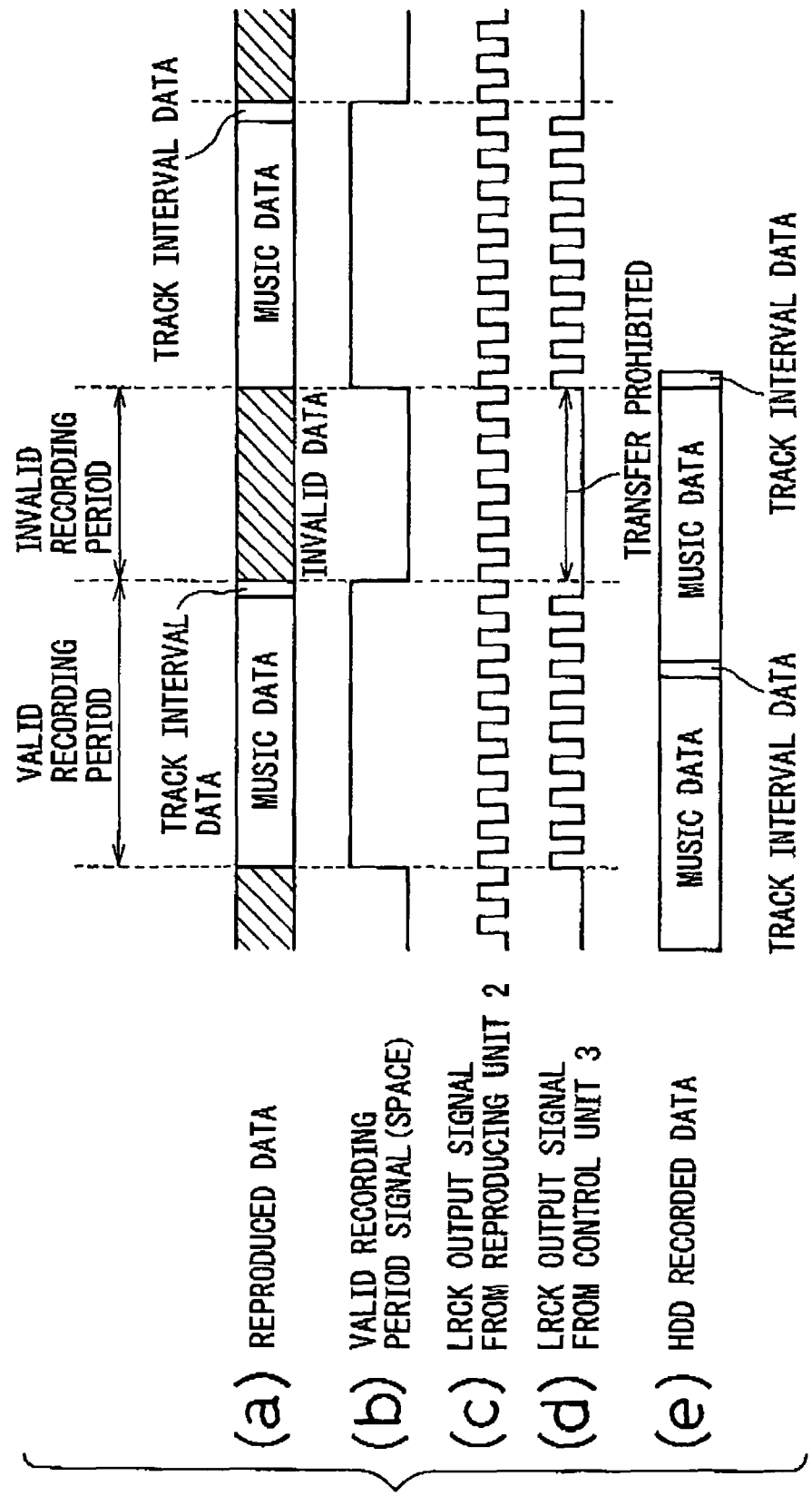
FIG. 2 is view of the data and operation waveforms in the case of recording music data at an HDD.

Further, when driving a CD 6 at a high rotational speed, the music data reproducing unit 2 reads out from the high speed rotating CD 6 the individual tracks of music information/data recorded on it, successively reproduces them as time-compressed data, outputs the signals of the three-line serial peripheral interface, that is, the data signal DATA and clock signals LRCK and BCK, to the valid recording period control unit 3, detects the ends of tracks based on the track interval information output from the CD 6, and outputs a valid recording period signal (hereinafter referred to as a "SPACE signal") enabling identification of the start and end of tracks including the track intervals such as shown in (b) of FIG. 2 to the valid recording period control unit 3.

That is, the music data reproducing unit 2 turns on the SPACE signal when reproducing a certain track from its head position based on a reproduction instruction from the system controller 1. When it then detects the end of the track including the track interval data, it turns off the SPACE signal. Further, when there is a reproduction instruction of the next track from the system controller 1, it reproduces the next track from its head position and turns on the SPACE signal. When then detecting the end of the track including the track interval data, it turns off the SPACE signal.

Figure 3:
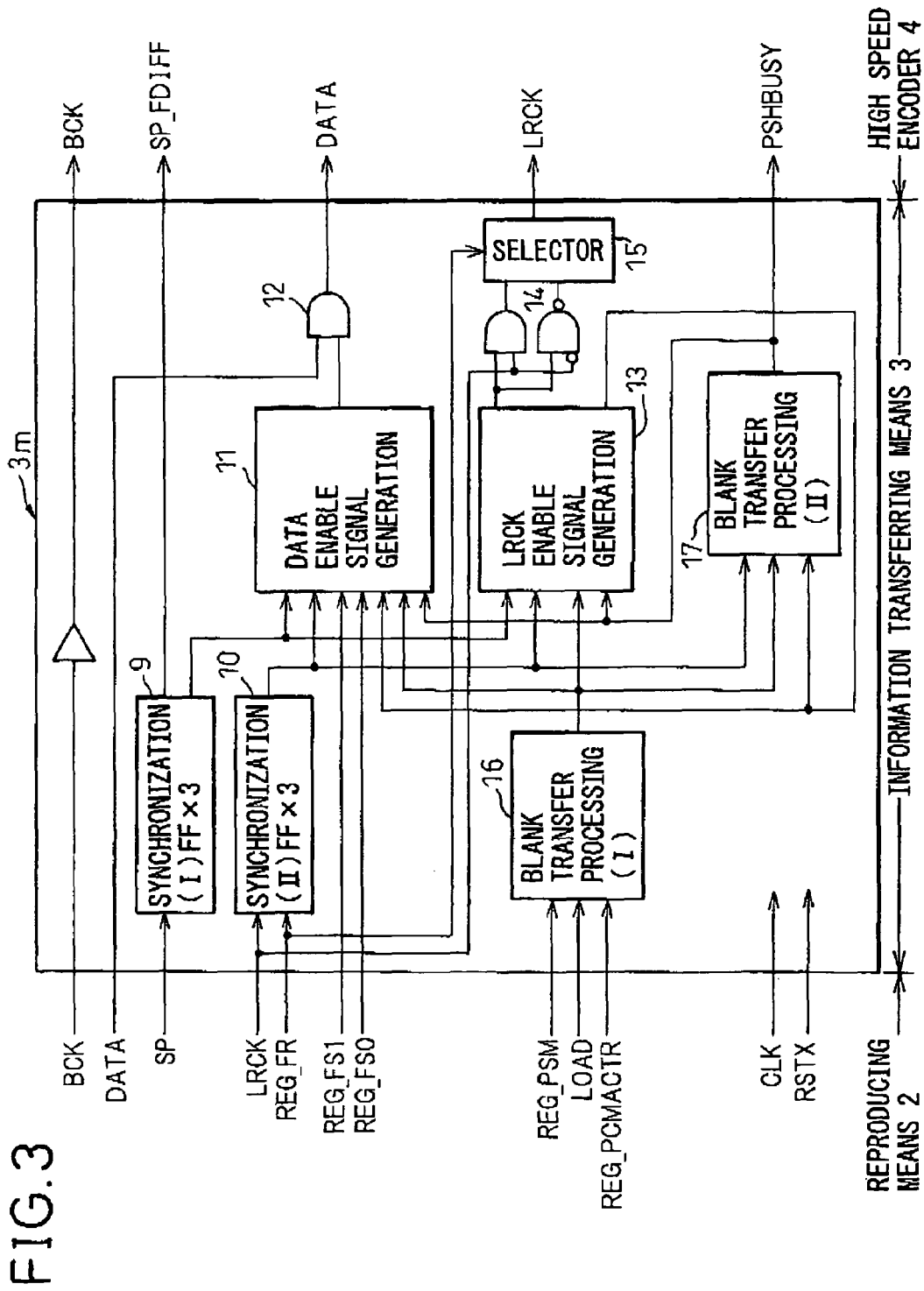
FIG. 3 is a view of a specific example of the configuration of an information transfer module of the present invention.
Figure 4:
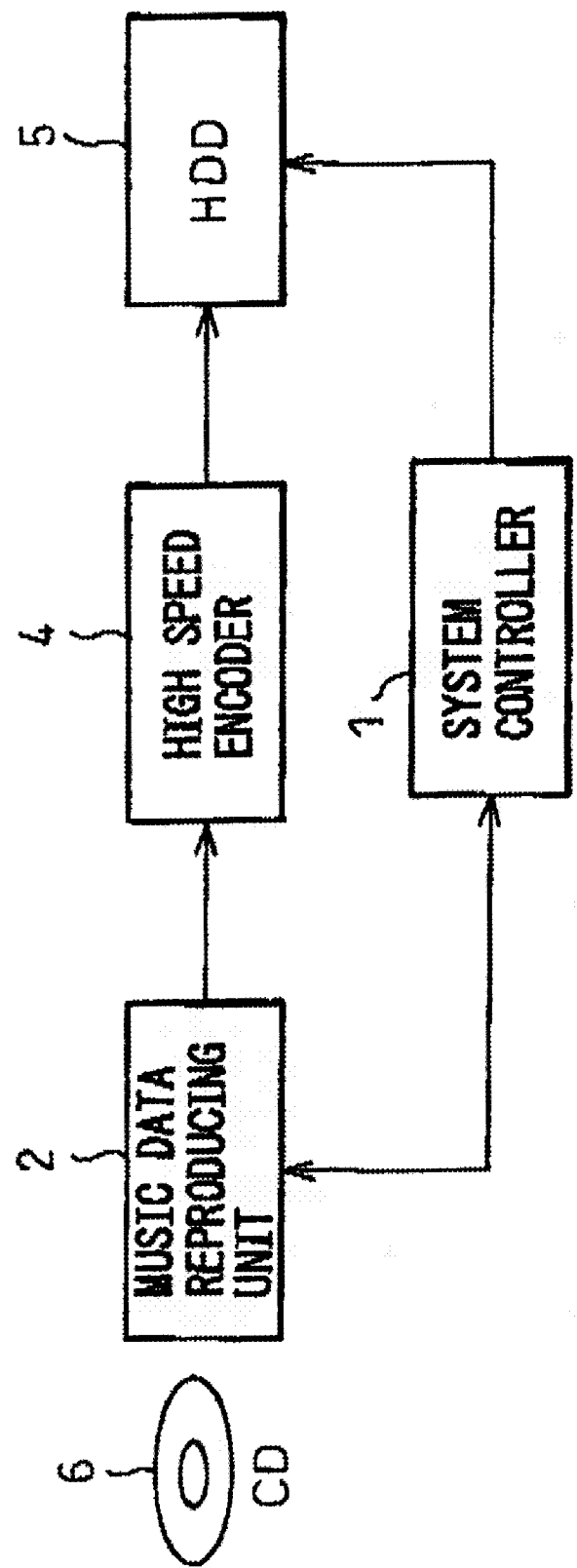
FIG. 4 is a schematic block diagram of a music information reproduction and recording apparatus of the related art.
Figure 5:
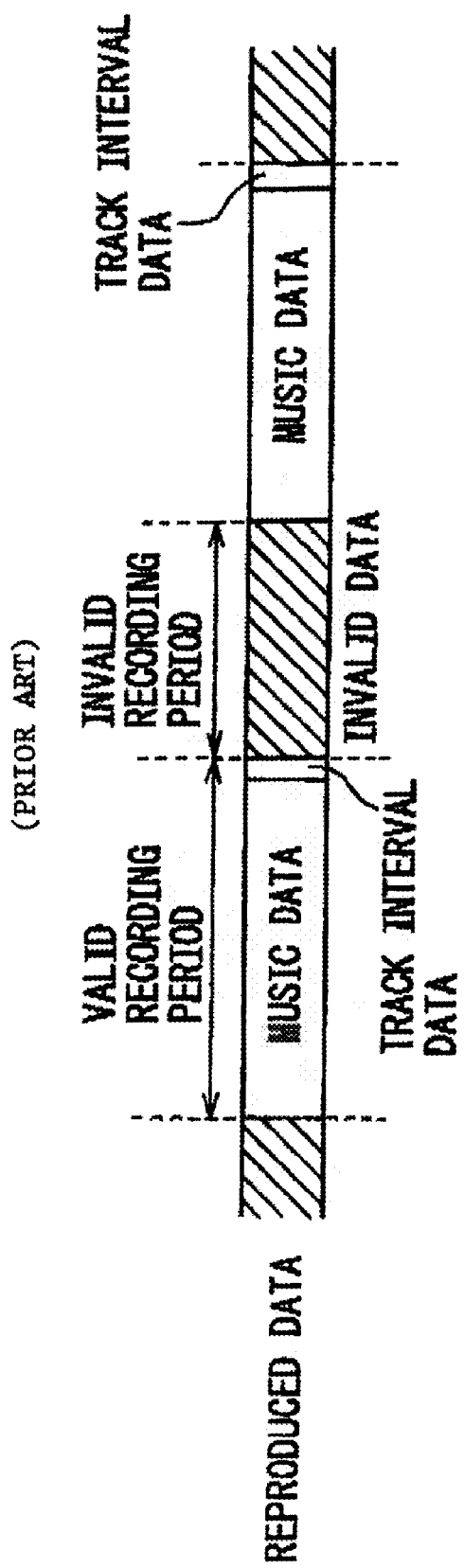
FIG. 5 is a view of reproduced data of a music information reproduction and recording apparatus.

Further, the valid recording period control unit 3 serving as the information transferring means transfers the data signal DATA and clock signals LRCK and BCK from the music data reproducing unit 2 while the SPACE signal is on. On the other hand, it suspends the transfer of one of the clock signals LRCK and BCK, for example, the clock signal LRCK, while the SPACE signal is off. Note that the information transferring means can be realized separately as an information transfer module (3m) in the form of an IC chip. A specific example of its configuration will be illustrated later (FIG. 3).

The high speed encoder 4 encodes the input data signal DATA at a high speed in accordance with a predetermined compression format based on the clock signals LRCK and BCK and supplies the encoded data to the HDD 5 as recording information/data. Note that this high speed encoder 4 is originally set so as to suspend this encoding when the LRCK and BCK signals have not arrived (clocks have not arrived).

The HDD 5 drives the recording medium storing the music, that is, the hard disk, so as to store a signal from a CD or other recording medium in the hard disk (not shown) built in the HDD 5 as recording information/data encoded by the high speed encoder 4.

Next, the action in the case of reproducing a signal from the CD 6 at 4× speed by the music data reproducing unit 2 and recording the music data on the hard disk will be explained using the data and operation waveforms of FIG. 2.

A CD 6 is digitally recorded with each track of a music signal etc. in its program region and is recorded with information showing the position of each track and other TOC (Table of Contents) information in its read-in region. At the time of reproduction from the CD, the music data reproducing unit 2 and system controller 1 store the track signal of the program information to be reproduced and recorded in track storage units (not shown) provided in each.

That is, when a user loads a CD 6 into the music data reproducing unit 2, the music data reproducing unit 2 reads the start address and end address of the information recorded in the CD 6 and the name of the track of the information and other listing information, acquires the track number for identification of the program information for the track from the above control data, and stores the same in the track storage unit.

When 4× speed reading and recording of information are instructed, the system controller 1 instructs high speed reading of the initial track to the music data reproducing unit 2. The music data reproducing unit 2 outputs the data signal DATA and clock signals LRCK and BCK to the valid recording period control unit 3 and outputs the SPACE signal shown in (b) of FIG. 2 to the valid recording period control unit 3 while outputting music data including the track interval data.

While the SPACE signal is being output, the valid recording period control unit 3 transfers the data signal DATA and clock signals LRCK and BCK to the high speed encoder 4. The high speed encoder 4 encodes the data signal DATA based on the clock signals LRCK and BCK. The music data for recording is sent to the HDD 5 and recorded on the hard disk.

When the recording to the hard disk is completed, the system controller 1 instructs reproduction of the data of the next track. While the reproduced data of the next track is being output, as shown in (a) FIG. 2, invalid data is output as the data signal DATA. However, during this period, the SPACE signal is not being output from the music data reproducing unit 2, so the valid recording period control unit 3, as shown in (d) of FIG. 2, suspends the transfer of the clock signal LRCK.

Due to this, the high speed encoder 4 cannot perform the encoding, so invalid data is not encoded and recorded on the hard disk. Therefore, the data recorded on the hard disk, as shown in (e) FIG. 2, does not include the invalid data between the tracks. Consequently, when reproducing this music data, it is possible to prevent a feeling of strangeness in the transition of the tracks.

FIG. 3 is a view of a specific example of the configuration of the information transfer module according to the present invention. In the figure, 3m indicates an information transfer module. This can be formed as a single IC chip. In the figure, the signals already shown in FIG. 1 are the BCK, DATA, and LRCK. SP is a SPACE signal. The other signals will be explained later.

Explaining the components particularly relevant to the present invention in FIG. 3,

1) BCK

In the illustrated embodiment, the case of output by gate through is shown, but it is also possible to configure the apparatus to suspend transfer of the BCK.

2) DATA

Due to the enable signal of the DATA enable signal generation unit 11, the period for not recording is masked by the AND gate 12 (low level output). Note that the DATA enable signal generation unit 11 controls the timing of masking so as not to pose a hazard to DATA.

3) LRCK

Due to the enable signal of the LRCK enable signal generation unit 13, the period for not recording is masked by the AND gate 14 (low/high level output). The selector unit 15 enables handling of the start of the LRCK (Lch side) in both the Low/High states. Note that the LRCK enable signal generation unit 13 controls the timing of masking so as not to pose a hazard to the LRCK.

Note that a blank transfer processing unit (I) 16 and a blank transfer processing unit (II) 17 are parts provided for processing the end of the recorded final track and are not directly relevant to the main functions of the present invention explained above.

The synchronization unit (I) at the top left in the figure inputs the SPACE signal SP. One of its outputs is input to each of the DATA enable signal generation unit 11 and LRCK enable signal generation unit 13 to suspend the transfer of data to the high speed encoder 4 or lift the suspension.

The above functional components mainly form the suspending function unit in the information transfer module 3m. Note that the roles of the signals not explained above are as follows:

| | |
|---|---|
| CLK: | System clock |
| RSTX: | Reset |
| REG_FR: | Setting of sign of Lch side of LRCK |
| 0: | Low level period of LRCK is Lch |
| 1: | High level period of LRCK is Lch |
| REG_PSH: | Setting of blank transfer function |
| REG_PCMACTR: | Count of writing of blank data of PCM input buffer (number of LRCK) |
| LOAD: | Load signal of REG_PCMACTR |
| REG_FS1: | Signal for switching among normal speed and 4X and 8X speed (higher bits) |
| REG_FS0: | Signal for switching among normal speed and 4X and 8X speed (lower bits) |
| PSHBUSY: | Flag of transfer of blank data to PCM input buffer |
| SP_FDIFF: | Pulse differentiating trailing edge of SP (one-shot) |

In the embodiment explained in detail above, when there is no valid recording period signal, the transfer of the clock signal LRCK is made to be suspended, but it is also possible to suspend the transfer of the clock signal BCK and further possible to suspend the transfer of all of the signals.

Further, in the above embodiment, the example of transferring the reproduced data by the data transfer system of a three-line serial peripheral interface was explained, but the present invention may also be applied to an information reproduction and recording apparatus using a data transfer system not including information on the start and end of data other than a three-line serial peripheral interface.

Further, in the above embodiment, the example of recording the music information of a CD on a hard disk was explained, but the information reproduction and recording apparatus of the present invention may also be applied to the case of recording data from various other recording media such as digital video disks (DVD) or other optical recording media to various storage means other than a hard disk. Further, the information reproduction and recording apparatus of the present invention may also be applied to various types of information other than music such as images.

Further, in the above embodiment, the transfer of the clock signal LRCK was made to be suspended or the transfer of the clock signal BCK was made to be suspended, but the invention is not limited to this. For example, it is also possible to give the SPACE signal to the high speed encoder, ignore (not encode) the data output from the information reproduction and recording apparatus while invalid data is being detected (while SPACE signal is not being input), and record reproduced data with substantially no sections of invalid data on the HDD.

While the invention has been described with reference to specific embodiments chosen for purpose of illustration, it should be apparent that numerous modifications could be made thereto by those skilled in the art without departing from the basic concept and scope of the invention.

The invention claimed is:

1. An information reproduction and recording apparatus, comprising:
    a reproducing function unit for reproducing information recorded on an information recording medium;
    an information transferring function unit for transferring the reproduced information from said reproducing function unit; and
    a recording function unit for recording the reproduced information from said information transferring function unit;
    wherein said reproducing function unit is configured to generate a signal for indicating a valid recording period and for identifying a start and an end of a track, and further configured to transmit the generated signal to said information transferring function unit, and
    wherein said information transferring function unit is configured to suspend transfer of the reproduced information to said recording function unit in response to absence of receipt of the signal from the reproducing function unit.

2. An information reproduction and recording apparatus as set forth in claim 1, further comprising a compressing function unit for compressing information between said information transferring function unit and said recording function unit.

3. An information reproduction and recording apparatus as set forth in claim 1, wherein
    said reproducing function unit outputs the reproduced information by a data transfer system of a three-line serial peripheral interface, and
    said information transferring function unit suspends transfer of one signal of at least clock signals LRCK and BCK among an input data signal DATA and the clock signals LRCK and BCK when said signal for indicating the valid recording period is not received.

4. An information reproduction and recording apparatus as set forth in claim 1, wherein said reproducing function unit is a CD reproducing function unit.

5. An information reproduction and recording apparatus as set forth in claim 1, wherein said reproducing function unit is a DVD reproducing function unit.

6. An information reproduction and recording apparatus as set forth in claim 1, wherein the information reproduced by said reproduction function unit is music information.

7. An information transfer module able to be installed between a reproducing function unit for reproducing information recorded on an information recording medium and a recording function unit for recording said reproduced information, both units being included in an information reproduction and recording apparatus,
    said information transfer module having at least a suspending function unit for suspending transfer of the reproduced information to said recording function unit in response to absence of receipt of a signal from the reproducing function unit, the signal for indicating a valid recording period and for identifying a start and an end of a track, the signal being output by a signal generating means contained in said reproducing function unit.

8. An information transfer module as set forth in claim 7, wherein the module is configured to suspend transfer of one signal of at least clock signals LRCK and BCK among an input data signal DATA and the clock signals LRCK and BCK when said signal for indicating the valid recording period is not input during input of the reproduced information by a data transfer system of a three-line serial peripheral interface transferring the data signal DATA and clock signals LRCK and BCK output from said reproducing function unit.

9. An information transfer module as set forth in claim 7, formed as an IC chip.

* * * * *